(12) United States Patent
Hwang et al.

(10) Patent No.: US 11,830,632 B2
(45) Date of Patent: Nov. 28, 2023

(54) APPARATUS FOR SEPARATING SHIELDING SLAB FOR HEAVY-WATER REACTOR

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 236 days.

(21) Appl. No.: 17/278,462

(22) PCT Filed: Sep. 20, 2019

(86) PCT No.: PCT/KR2019/012294
§ 371 (c)(1),
(2) Date: Mar. 22, 2021

(87) PCT Pub. No.: WO2020/060331
PCT Pub. Date: Mar. 26, 2020

(65) Prior Publication Data
US 2022/0037044 A1    Feb. 3, 2022

(30) Foreign Application Priority Data
Sep. 21, 2018  (KR) .......................... 10-2018-0114254

(51) Int. Cl.
*G21D 1/00* (2006.01)
*G21F 3/00* (2006.01)

(52) U.S. Cl.
CPC .............. *G21D 1/003* (2013.01); *G21F 3/00* (2013.01)

(58) Field of Classification Search
CPC .......... G21D 1/003; G21F 9/30; G21C 19/207
See application file for complete search history.

(56) References Cited

U.S. PATENT DOCUMENTS 4,813,313 A * 3/1989 Ichikawa ............... B28D 1/045
976/DIG. 293
5,001,840 A * 3/1991 Dixon ................. G21C 19/207
33/502
9,431,135 B2    8/2016 Rea
(Continued)

FOREIGN PATENT DOCUMENTS

JP          05-273390         10/1993
JP          H05273390      * 10/1993    ............... G21F 9/30
(Continued)

*Primary Examiner* — Sharon M Davis
(74) *Attorney, Agent, or Firm* — LEX IP MEISTER, PLLC

(57) ABSTRACT

A device for separating a shielding slab for a heavy water reactor according to an embodiment includes: a body; a circular rail installed on at least one side of the body; and a decommissioner for decommissioning a shielding slab installed on the circular rail and installed on an inner wall of a heavy water reactor, wherein the decommissioner includes a decommission head moving on the circular rail, a separator installed in the decommission head and separating and desalinizing the shielding slab, and a gripper installed in the decommission head and gripping the separated shielding slab.

7 Claims, 4 Drawing Sheets

(56) References Cited

U.S. PATENT DOCUMENTS

2008/0317192 A1* 12/2008 Rowell ................ G21C 19/207
376/249
2010/0329408 A1* 12/2010 Fiodorov ............. G21C 17/017
976/DIG. 245
2015/0200025 A1* 7/2015 Hastings .............. G21C 17/007
376/249

FOREIGN PATENT DOCUMENTS

| JP | 10-026688 | | 1/1998 | |
|----|-----------|---|--------|---|
| JP | 10-094765 | | 4/1998 | |
| JP | 10-227888 | | 8/1998 | |
| KR | 305385 | | 11/2001 | |
| KR | 200701373350 | * | 12/2007 | ............. G21C 15/24 |
| KR | 10-0929450 | | 12/2009 | |
| KR | 20130164141 | * | 10/2013 | |
| KR | 2015-0075822 | | 7/2015 | |
| KR | 10-1564617 | | 11/2015 | |

* cited by examiner

APPARATUS FOR SEPARATING SHIELDING SLAB FOR HEAVY-WATER REACTOR

TECHNICAL FIELD

The present invention relates to a device for separating a shielding slab for a heavy water reactor.

BACKGROUND ART

In general, a calandria is a cylinder for injecting nuclear fuel to a reactor in a nuclear power plant in a heavy water reactor type, and has a cylinder pipe structure for injecting nuclear fuel during normal driving of the power plant and discharging combusted nuclear fuel bundle.

When the heavy water reactor is decommissioned, the calandria must be removed, and a shielding slab disposed on an activated biodegradable concrete wall must be separated from the biodegradable concrete.

However, the shielding slab is also activated, so it is difficult for a worker to directly separate and desalinize it for fear of exposure to radiation.

DISCLOSURE

The present invention has been made in an effort to provide a device for separating a shielding slab for a heavy water reactor for safely and quickly separating and desalinizing a shielding slab for a heavy water reactor without a worker's exposure to radiation.

An embodiment of the present invention provides a device for separating a shielding slab for a heavy water reactor, including: a body; a circular rail installed on at least one side of the body; and a decommissioner for decommissioning a shielding slab installed on the circular rail and installed on an inner wall of a heavy water reactor, wherein the decommissioner includes a decommission head moving on the circular rail, a separator installed in the decommission head and separating and desalinizing the shielding slab, and a gripper installed in the decommission head and gripping the separated shielding slab.

The decommissioner may further include a basket for collecting a shielding slab separated from the inner wall of the heavy water reactor by the separator and the gripper.

The shielding slab may be installed on a boundary of a biodegradable concrete of the heavy water reactor and an end shield, and has a circular ring shape, and the decommissioner may move on the circular rail and may decommission the shielding slab.

The device may further include a fixer for fixing the circular rail by connecting portions facing each other on the circular rail.

The device may further include a supporter for supporting the body.

The supporter may be movable.

The decommissioner may further include a level-off unit installed on the decommission head and measuring and maintaining a leveling-off state of the decommission head.

According to the embodiment, the shielding slab for a heavy water reactor may be safely and quickly separated and desalinized, without the worker's exposure to radiation, by using the device for separating a shielding slab for a heavy water reactor.

MODE FOR INVENTION

Figure 1:
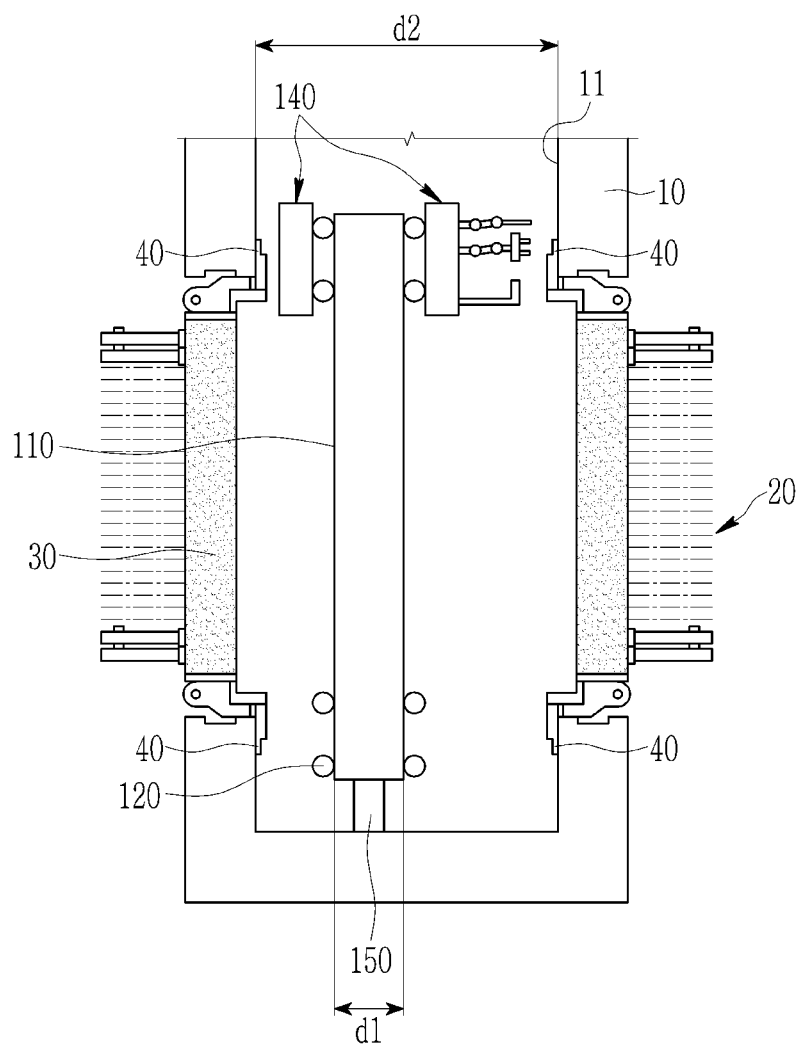
FIG. 1 shows a lateral view of a state in which a device for separating a shielding slab for a heavy water reactor according to an embodiment is in a biodegradable concrete of a heavy water reactor.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Parts that are irrelevant to the description will be omitted to clearly describe the present invention, and the same elements will be designated by the same reference numerals throughout the specification.

The size and thickness of each configuration shown in the drawings are arbitrarily shown for better understanding and ease of description, but the present invention is not limited thereto.

Figure 2:
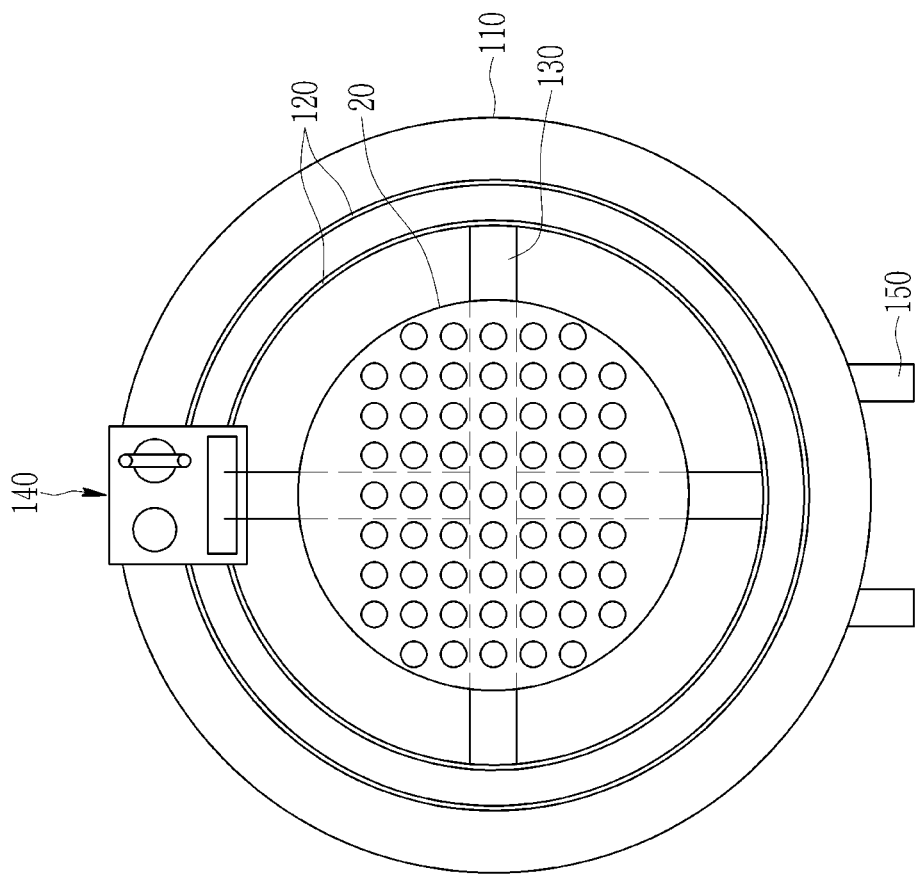
FIG. 2 shows a front view of a device for separating a shielding slab for a heavy water reactor according to an embodiment.
Figure 3:
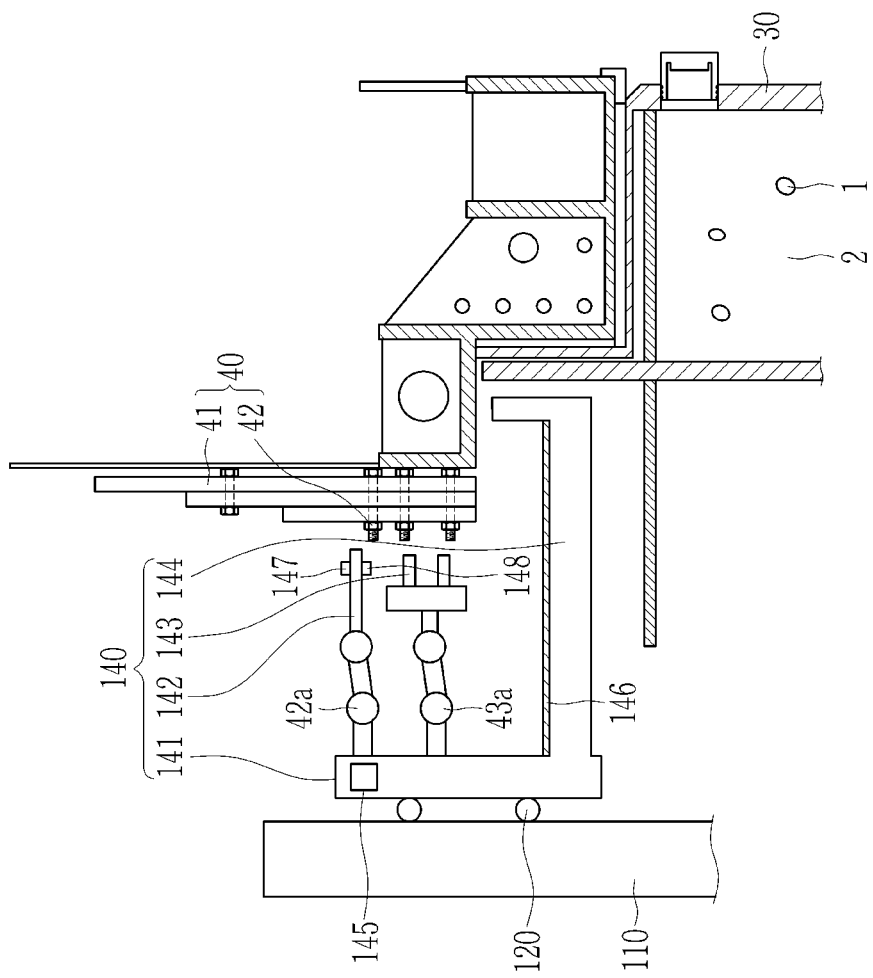
FIG. 3 shows a state of separating and desalinizing a shielding slab by using a device for separating a shielding slab for a heavy water reactor according to an embodiment.

FIG. 1 shows a lateral view of a state in which a device for separating a shielding slab for a heavy water reactor according to an embodiment is in a biodegradable concrete of a heavy water reactor, FIG. 2 shows a front view of a device for separating a shielding slab for a heavy water reactor according to an embodiment, and FIG. 3 shows a state of separating and desalinizing a shielding slab by using a device for separating a shielding slab for a heavy water reactor according to an embodiment.

As shown in FIG. 1 to FIG. 3, the device for separating a shielding slab for a heavy water reactor may include a body 110, a circular rail 120 installed on at least one side of the body 110, a fixer 130 for fixing the circular rail 120, a decommissioner 140 installed in the circular rail 120, and a supporter 150 for supporting the body 110.

A calandria (not shown) that was in a biodegradable concrete 10, an inner wall of the heavy water reactor, is removed, and the device for separating a shielding slab for a heavy water reactor according to an embodiment is put into the biodegradable concrete 10.

A thickness d1 of the body 110 may be less than a size d2 of a drop 11 of the biodegradable concrete 10. Therefore, the body 110 may be easily put into the biodegradable concrete 10. As shown in FIG. 2, the body 110 may have a flat cylinder shape. However, while not being limited thereto, it may have various shapes as long as it may be put into the biodegradable concrete 10.

The circular rail 120 guides a path on which the decommissioner 140 is movable. Hence, the decommissioner 140 may be positioned near the shielding slab 40 positioned on top, bottom, right, and left sides in the biodegradable concrete 10 along the circular rail 120. In the present embodiment, the circular rail 120 is installed on respective sides of the body 110, and without being limited thereto, it is also possible to install the circular rail 120 on one side of the body 110.

Figure 4:
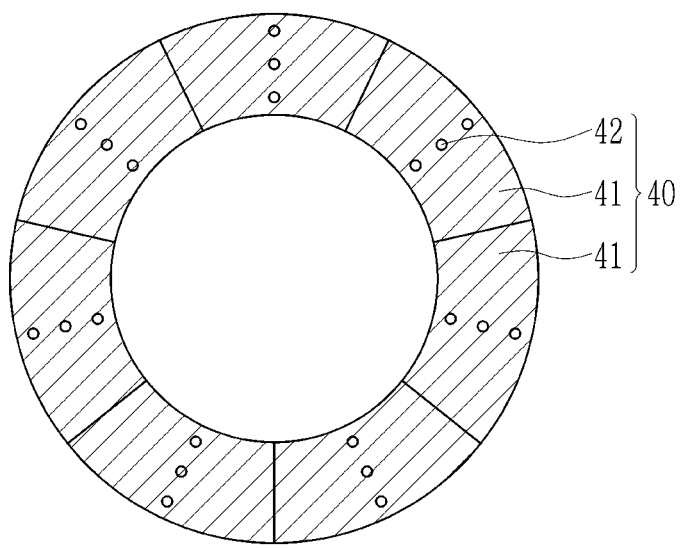
FIG. 4 shows a front view of a shielding slab for separating a part by using a device for separating a shielding slab for a heavy water reactor according to an embodiment.

FIG. 4 shows a front view of a shielding slab for separating a part by using a device for separating a shielding slab for a heavy water reactor according to an embodiment.

As shown in FIG. 4, the shielding slab 40 is installed on a boundary of the biodegradable concrete 10 of the heavy water reactor and an end shield 30. In this instance, the end shield 30 represents a structure connected to a pressure tube 20 installed on an outer wall of the biodegradable concrete 10. The shielding slab 40 is installed to more perfectly shield the radiation discharged from the calandria. The shielding slab 40 may have a circular ring shape, as shown in FIG. 4. The shielding slab 40 may include a plurality of sub-slabs 41, and a fastening member 42 for fastening the sub-slabs 41 and the biodegradable concrete 10.

The fixer 130 may fix the circular rail 120 by connecting portions facing each other in the circular rail 120. The fixer 130 may have a cross shape, but it is not limited thereto, and it may have various types of shapes so long as it prevents transformation of the circular rail 120.

The decommissioner 140 decommissions the shielding slab 40 installed in the biodegradable concrete 10. The decommissioner 140 may decommission the shielding slab 40 while moving along the circular rail 120.

The decommissioner 140 includes a decommission head 141, a separator 142 installed in the decommission head 141, a gripper 143, and a basket 144.

The decommission head 141 may directly contact the circular rail 120 and may move on the circular rail 120.

The separator 142 may separate and desalinize the shielding slab 40. The separator 142 may separate the shielding slab 40 from the biodegradable concrete 10 by unfastening the fastening member 42 of the shielding slab 40. The separator 142 may be a driver or a drill for unfastening the fastening member 42. The separator 142 may have a plurality of joint structures 42a. Therefore, the shielding slab 40 provided on various positions may be easily separated.

A desalinizer 147 may be installed in the separator 142. The desalinizer 147 may remove a salt by a physical method using a water jet and an abrasive or by a chemical method using chemicals.

A radiac meter 148 may be installed in the separator 142. Therefore, a desalinization effect may be measured or a characteristic of radiation after desalinization may be analyzed by using the radiac meter 148.

The gripper 143 is separated from the separator 142 and is positioned near the same, and it may grip the separated shielding slab 40 and may move it to the basket 144. The gripper 143 may have a plurality of joint structures 43a and may easily move the shielding slab 40 in a desired direction.

The basket 144 is positioned below the separator 142 and the gripper 143, and it may collect and preserve the shielding slab 40 separated from the biodegradable concrete 10 by the separator 142 and the gripper 143. A magnetic material 146 may be installed in the basket 144. Therefore, the magnetic material 146 may prevent the separated shielding slab 40 from falling from or leaving the basket 144.

A level-off unit 145 may be installed in the decommission head 141. The level-off unit 145 may determine whether the decommission head 141 levels off by measuring the leveling state of the decommission head 141. Further, the level-off unit 1475 may be connected to a driver (not shown) of the decommission head 141 to level off the decommission head 141.

The supporter 150 may contact a bottom surface of the biodegradable concrete 10 to stably support the body 110.

The supporter 150 may also have a mover (not shown) so as to quickly move the body 110.

Therefore, in the present embodiment, the shielding slab 40 for a heavy water reactor may be separated from the biodegradable concrete 10 and be desalinized safely and quickly without exposure of a worker to radiation by remote control by using the device for separating a shielding slab for a heavy water reactor.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A device for separating a shielding slab for a heavy water reactor, comprising:
   a body;
   a circular rail installed on at least one side of the body; and
   a decommissioner configured to decommission a shielding slab, wherein the decommissioner is installed on the circular rail and the shielding slab is installed on an inner wall of a heavy water reactor,
   wherein the decommissioner includes
   a decommission head extending in a longitudinal direction of the heavy water reactor, the decommission head configured to move on the circular rail,
   a separator extending from the decommission head, the separator configured to separate the shielding slab from the heavy water reactor,
   a desalinizer installed in the separator, the desalinizer configured to desalinize the shielding slab, and
   a gripper installed in the decommission head, the gripper configured to grip the separated shielding slab, and
   wherein the decommission head contacts the circular rail and moves directly on the circular rail.

2. The device of claim 1, wherein
   the decommissioner further includes a basket configured to collecting the shielding slab separated from the inner wall of the heavy water reactor by the separator and the gripper.

3. The device of claim 2, wherein the shielding slab is installed on an inner wall of a biodegradable concrete of the heavy water reactor, and the shielding slab has a ring shape.

4. The device of claim 1, further comprising
   a connector extending in a diameter direction of the circular rail, the connector configured to hold the circular rail.

5. The device of claim 1, further comprising
   a supporter disposed under the body to support a lower portion of the body.

6. The device of claim 5, wherein
   the supporter is movable.

7. The device of claim 1, wherein
   the decommissioner further includes a horizontal measuring unit installed on the decommission head, the horizontal measuring unit configured to measure a leveling-off state of the decommission head.

* * * * *